(12) United States Patent
Barry et al.

(10) Patent No.: US 8,674,852 B2
(45) Date of Patent: Mar. 18, 2014

(54) METHOD AND SYSTEM FOR DISPLAYING SYMBOLOGIES ON AN AIRCRAFT

(75) Inventors: Julien Barry, Toulouse (FR); Laurent Valex, Blagnac (FR); Patrice Rouquette, Pompertuzat (FR)

(73) Assignee: Airbus Operations SAS, Toulouse (FR)

( * ) Notice: Subject to any disclaimer, the term of this patent is extended or adjusted under 35 U.S.C. 154(b) by 585 days.

(21) Appl. No.: 12/688,094

(22) Filed: Jan. 15, 2010

(65) Prior Publication Data
US 2010/0182165 A1 Jul. 22, 2010

(30) Foreign Application Priority Data
Jan. 19, 2009 (FR) ..................................... 09 00219

(51) Int. Cl.
*G01C 21/00* (2006.01)
*G01C 23/00* (2006.01)

(52) U.S. Cl.
USPC ........... 340/971; 340/945; 340/973; 340/974; 701/3; 701/14

(58) Field of Classification Search
USPC ........................................................ 340/971
See application file for complete search history.

(56) References Cited

U.S. PATENT DOCUMENTS

| | | | | |
|---|---|---|---|---|
| 4,692,869 A | * | 9/1987 | King et al. | 701/467 |
| 6,985,801 B1 | * | 1/2006 | Straub et al. | 701/3 |
| 7,724,259 B2 | * | 5/2010 | Hedrick et al. | 345/501 |
| 7,937,641 B2 | * | 5/2011 | Amidi | 714/758 |
| 2004/0183697 A1 | * | 9/2004 | Rogers et al. | 340/971 |
| 2006/0077039 A1 | | 4/2006 | Ibi et al. | |

FOREIGN PATENT DOCUMENTS

| | | |
|---|---|---|
| EP | 1762825 | 3/2007 |
| EP | 1762825 A2 * | 3/2007 |
| JP | 2000-10676 | 1/2000 |
| JP | 2006-106897 | 4/2006 |

OTHER PUBLICATIONS

Smith et al., The Army Operations Aircraft Integrated Avionics Subsystem—An Operational Perspective,1991, IBM Federal Sector Division, IEEE.*
Smith, et al., The Army Special Operations Aircraft Integrated Avionics Subsystem—an Operational Perspective, IEEE, Oct. 1991, pp. 533-538.

* cited by examiner

*Primary Examiner* — George Bugg
*Assistant Examiner* — Anthony D Afrifa-Kyei
(74) *Attorney, Agent, or Firm* — Novak Druce Connolly Bove + Quigg LLP (57) ABSTRACT

The display system (1) comprises means (5, 11A, 14) to take into account a recorded symbology, in the event of a malfunction in the emission of a symbology, to perform a display of symbology.

13 Claims, 5 Drawing Sheets

METHOD AND SYSTEM FOR DISPLAYING SYMBOLOGIES ON AN AIRCRAFT

CROSS-REFERENCE TO RELATED APPLICATIONS

This application claims priority to French Patent Application 0900219, filed Jan. 19, 2009, the entire contents of which are incorporated herein by reference.

FIELD OF THE INVENTION

The invention relates to a method and system for displaying symbologies on an aircraft, in particular on a transport plane.

BACKGROUND OF THE INVENTION

The invention applies, in particular, to the display of symbologies which are referenced within a geographical frame of reference, i.e. a frame of reference which is defined with respect to the Earth, such as, for instance, the terrestrial frame of reference which defines any point on the terrestrial sphere in terms of its longitude and latitude.

On an aircraft, such symbologies are used in particular for the navigation thereof.

It is known that there are several display devices in the cockpit of an aircraft, for example electronic screens of the "Electronic Instrument System" type (EIS) or the "Control and Display System" type (CDS), which display several kinds of formats. A format is made up of several kinds of parameters (speed of the aircraft, roll angle, etc.), symbols (surrounding traffic, ground beacons, etc.) or coherent symbologies (weather images, flight plan, etc.). Usually, a display device builds the formats that it displays from data or symbols which are sent to it by the aircraft's computers. By way of illustration, generally the roll angle is transmitted by the inertial systems and the flight plan is transmitted by a flight management system.

However, if a computer provided for transmitting a parameter to a display device exhibits a malfunction, the display of that parameter, or of symbols using that parameter, is lost.

SUMMARY OF THE INVENTION

The present invention aims to solve this disadvantage. It relates to a display method for displaying, in an aircraft, at least one symbology which is referenced within a geographical frame of reference; a process which allows the display of such symbology to be maintained during a malfunction relating to its emission.

To this effect, according to the invention, a method wherein:

a) a computer emits, in a repetitive manner, to a destination of at least one display device, at least one symbology in the form of a protocol which includes at least one graphic object provided with geographical coordinates which are defined in said geographical frame of reference;

b) said display device carries out the following operations consisting in:

automatically analyzing each symbology being received so as to identify the corresponding graphic object;

automatically projecting such graphic object into a display frame of reference which is linked to a visualisation screen, in such a manner as to obtain the auxiliary coordinates which are defined in such display frame of reference; and automatically transmitting display information to said visualisation screen, including said graphic object and said auxiliary coordinates; and c) said symbology is displayed on said visualisation screen, in accordance with said display information, is remarkable in that moreover:

each symbology received from said computer and provided for said display device is automatically recorded in an memory external to said computer;

the emission of symbology performed by said computer is automatically monitored in such a way as to be able to detect a possible malfunction; and when such a malfunction is detected, a switch is automatically effected:

from a normal mode of operation, which utilises the symbologies received from said computer to perform steps b) and c) and is activated when no malfunction is present;

to a back-up mode of operation, which utilises the most recent symbology stored in said memory to perform steps b) and c).

Hence, through the invention, when a malfunction appears in the emission of a symbology from the computer to the display device, for example when the computer is no longer able to define the symbology or when the connection between the computer and the display device exhibits a particular malfunction, the display device is switched to a back-up mode of operation, in which it is able to continue to display that symbology.

To do this, during a normal operation, any symbology generated by said computer and intended for said display device is recorded and, during a malfunction, the last recorded symbology is used. As a consequence, thanks to the invention, no loss of the displayed symbology occurs during a malfunction of the computer.

This invention does not apply to any symbology, but to a symbology which is referenced within a geographical frame of reference that does not move with time (or only very slightly with respect to the time of flight), such that the last coordinates recorded can be utilised. By way of illustration, the longitude and latitude coordinates of a beacon installed on the ground do not change over the course of an aircraft's flight.

In an advantageous way, when such a malfunction is detected, the recording in said memory of the symbology received from said computer is automatically suspended.

Moreover, in a preferred embodiment of the invention, after a malfunction is detected, the emission of the symbology continues to be monitored in such a way as to be able to detect a return to normal operation and, in the event of such a return to normal operation, a switch is made from back-up operating mode to normal operating mode in which the symbologies received from the computer are again taken into account for performing the above-mentioned steps b) and c).

Furthermore:

in a first embodiment of the invention, said memory is integrated into said display device; and in a second embodiment, said memory is integrated into an auxiliary computer.

The invention also relates to a display system for an aircraft, intended to display at least one symbology which is referenced within a geographical frame of reference such as the terrestrial frame of reference.

To this effect, according to the invention, said system of the type comprising:

a computer which emits, in a repetitive manner, to a destination of at least one display device, at least one symbology in the form of a protocol which includes at least one graphic object provided with geographical coordinates which are defined in said geographical frame of reference;

said display device which comprises:

first means for automatically analysing each symbology received, in such a way as to identify the corresponding graphic object;

second means for automatically projecting this graphic object into a display frame of reference linked to a visualisation screen in such a way as to obtain the auxiliary coordinates which are defined within said display frame of reference; and third means for automatically sending information to said visualisation screen, including said graphic object and said auxiliary coordinates; and said visualisation screen which displays said symbology in accordance with said display information received from said third means, is remarkable, in that it comprises moreover:

a memory to be specified hereinbelow, which is external to said computer and which is formed in such a way as to automatically record each symbology emitted by said computer and intended for said display device;

monitoring means which automatically monitor the emission of symbology performed by said computer in such a manner as to be able to detect a possible malfunction; and switching means which are integrated into said display device and which are formed in such a manner as to automatically carry out, when a malfunction is detected by said monitoring means, a switching:

from a normal mode of operation, in which said first means use the symbologies received from said computer, and which is active when no malfunction is present;

to a back-up mode of operation, for which said first means use the symbology last recorded in said memory.

In the invention, symbologies are therefore defined in geographical coordinates relative to the geographical frames of reference, for example longitude and latitude, and are transmitted to the display device in the form of a protocol which contains simple graphic objects, such as circles or segments, enabling the corresponding symbology to be characterised. These graphic objects are defined by their geographical coordinates, for example the coordinates of the centre and the value of its radius for a circle, or the coordinates of the end points for a segment.

In a preferred embodiment, said display system comprises, moreover, auxiliary means for carrying out a switch when a return to normal operation is detected, from the back-up mode of operation to the normal mode of operation, for which said first means again use the symbologies received from a computer, in particular a flight management computer.

In a first variation of this preferred embodiment, said auxiliary methods comprise:

monitoring means which automatically monitor the emission of symbology carried out by said computer in such a manner as to be able to detect a return to normal operation;

an interactive screen which displays, when a return to normal operation is detected, a sensitive object able to be activated; an activation of which sensitive object causes an automatic switch from the back-up mode of operation to the normal mode of operation; and means enabling for said sensitive object to be activated by an operator.

Moreover, in a second variation of this preferred embodiment, said auxiliary means are automatically ordered by switching of said display device to an auxiliary computer, which will be used in the place of said computer to emit the symbologies.

Furthermore:

in a first embodiment of the invention, said memory is integrated into said display device; and in a second embodiment, said memory is integrated into an auxiliary computer.

The invention also relates to an aircraft, in particular a transport plane, which contains a display system such as disclosed hereinabove.

BRIEF DESCRIPTION OF THE DRAWINGS

The figures in the attached drawing will enable understanding of how the invention can be realised. In these figures, identical references designate similar elements.

DETAILED DESCRIPTION

Figure 1:
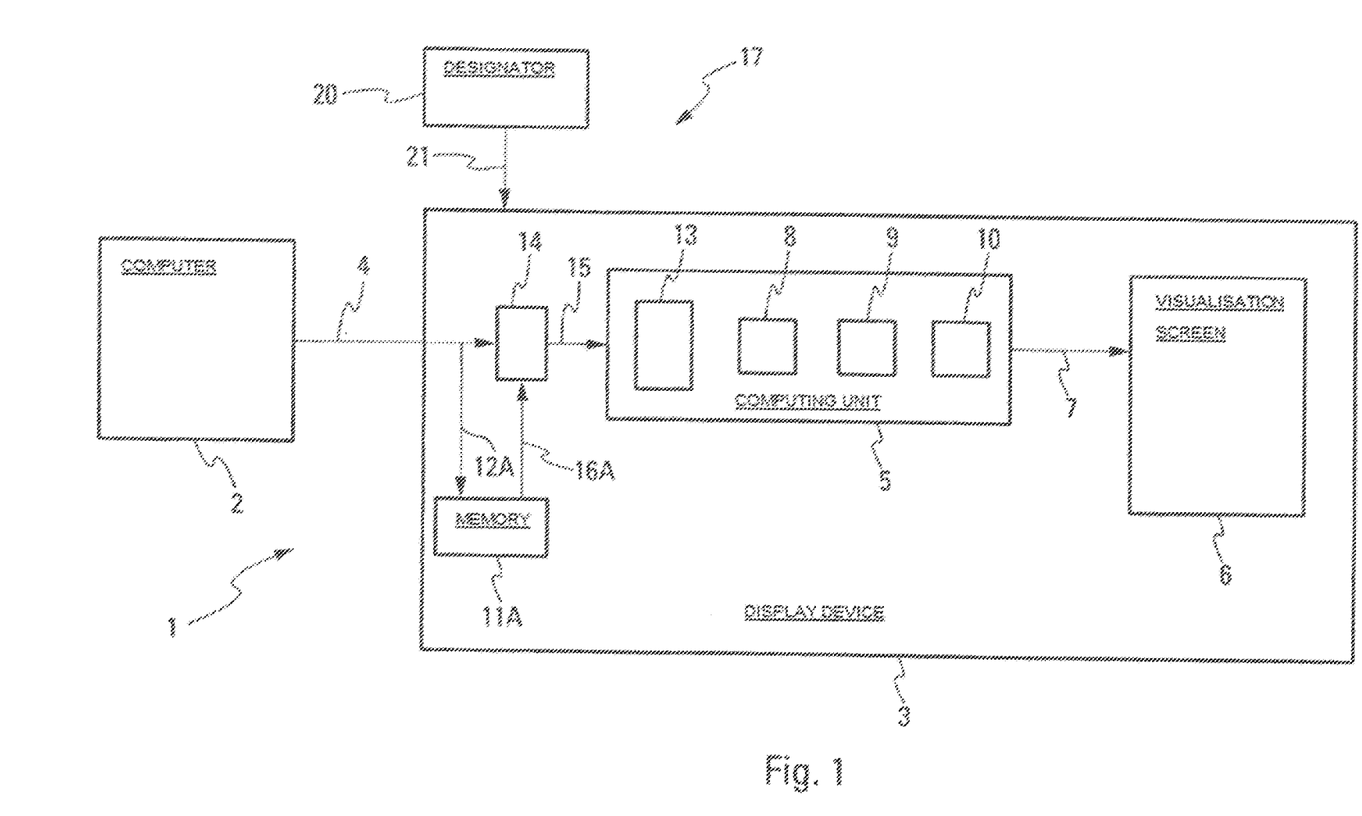
FIGS. 1 and 2 show two different embodiments of a display system according to the invention.
Figure 2:
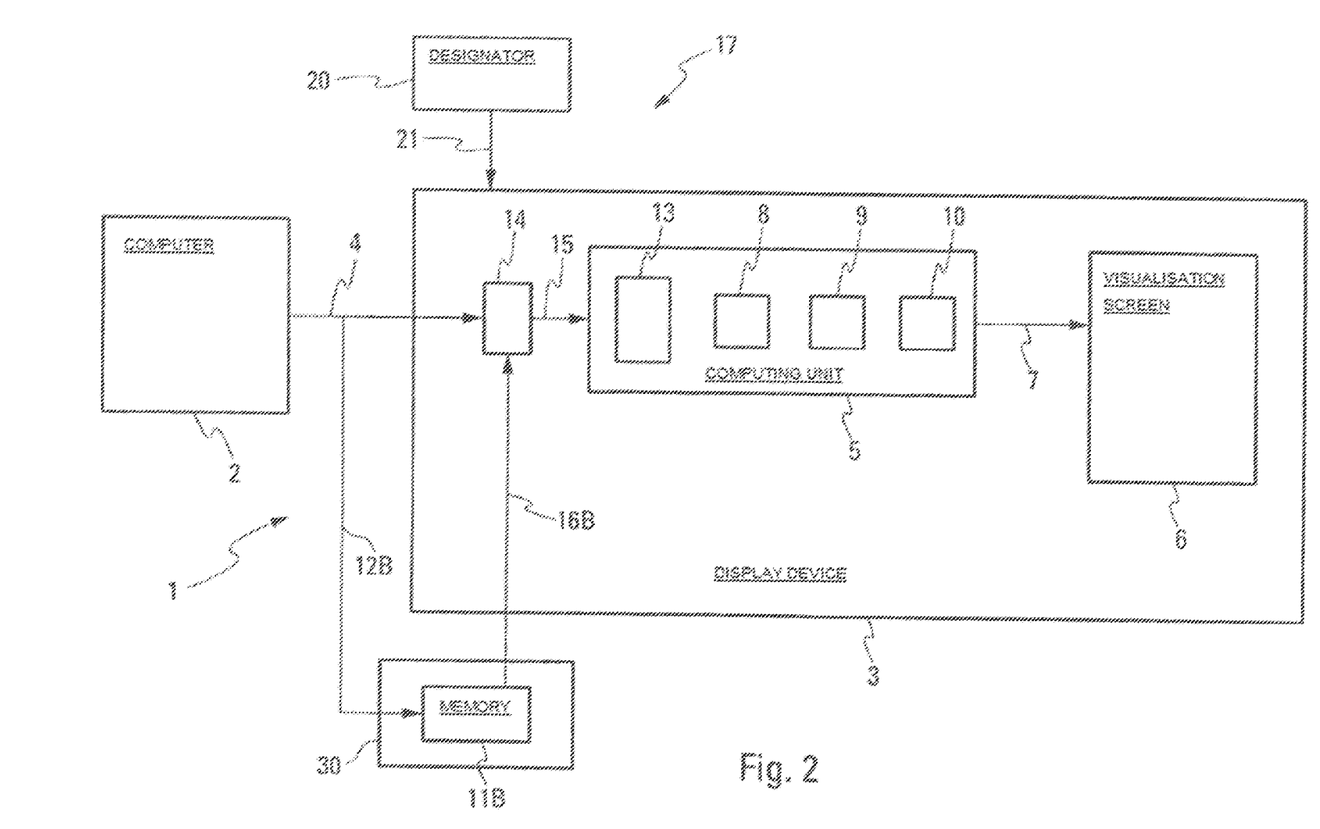

The system 1 according to the invention and schematically shown in FIGS. 1 and 2 is for displaying, in the cockpit of an aircraft (not shown), in particular a transport plane, at least one symbology S which is referenced in at least one geographical frame of reference.

For the purposes of the invention, a geographical frame of reference means a frame of reference which is defined in relation to the Earth, and in particular the terrestrial frame of reference which defines any point on the terrestrial globe by longitude and latitude. By way of illustration, this symbology could simply correspond to the position of a beacon situated on the ground or to a flight plan defined in the horizontal plane.

To achieve this, as represented in FIG. 1, said system 1 comprises:

a computer 2, for example a flight management computer of the FMC type, which emits, in a repetitive manner, at least one symbology in the form of a protocol comprising at least one graphic object, for example a circle or a segment, which possesses geographical coordinates (in particular longitude and latitude) defined in said geographical frame of reference; for example the coordinates of the centre and the value of the radius for a circle or the coordinates of the end points for a segment;

a display device 3, for example of the "Control and Display System" type, CDS, which is linked via a connection 4 to said computer 2 in such a way as to be able to receive any symbology emitted by this computer 2 and which contains at least one computing unit 5 specified below; and a visualisation screen (6) which is linked via a connection 7 to said computing unit 5. Preferably, this visualisation screen 6 forms part of said display device 3.

Said computing unit 5 comprises:

means 8 to automatically analyse (and decode), in the usual manner, each symbology received in such a way as to identify the graphic object or objects (circle, segment, etc.) of this symbology;

means 9 to apply, in the usual way, a projection algorithm to the graphic objects being decoded by the means 8, in such a way as to project them (from the frame of reference where they are defined, namely the geographical frame of reference) into a display frame of reference which is linked to the visualisation screen 6. Said means 9 thus generate auxiliary coordinates relating to said graphic objects, which are defined within said display frame of reference; and means 10 to automatically transmit the display information to the visualisation screen 6 (via the connection 7). This display information comprises the graphic object or objects of the symbol utilised and the auxiliary coordinates linked to this or these graphic objects, i.e. the coordinates which are defined in the display frame of reference.

This display information enables said symbology to be represented in the display frame of reference. Said visualisation screen 6 is designed in such a manner as to display the symbology S, according to said display information received from said means 10, as represented for example in FIG. 2.

According to the invention, said display system 1 further comprises:

a memory 11A,11B detailed hereinbelow, which is formed in such a way as to automatically receive, via a connection 12A, 12B which is linked to the connection 4, each symbology emitted by said computer 2 and intended for said display device 3. This memory 11A, 11B automatically records each symbology received;

monitoring means 13 which are, for example, included in the computing unit 5 and which are formed in such a way as to automatically monitor the emission of symbology performed by said computer 2 in such a way as to be able to detect a possible malfunction; and switching means 14 which are integrated into the display device 3, which are linked to said computer 2 and to said computing unit 5 via the connections 4 and 15 respectively, and to said memory 11A, 11B via a connection 16A, 16B, and are formed in such a way as to automatically perform, when a malfunction is detected by said monitoring means 13, the switching:

from a normal mode of operation, for which said computing unit 5 and in particular said means 8 take into account (via the connection 15), the symbologies received from said computer 2. This normal mode of operation is therefore activated in the absence of a malfunction;

to a back-up mode of operation, for which said computing unit 5 and in particular said means 8 take into account, via the connection 15, the last symbology recorded in said memory 11A, 11B and received by the switching means via the connection 16A, 163, and no longer a symbology received from the computer 2.

Consequently, in the normal mode of operation, the display system 1 performs a display using the normal processes. In contrast, in the back-up mode, the various processes, and in particular the decoding performed by the means 8, are applied to the symbology which was last recorded in the memory 11A, 11B.

Hence, by use of the invention, when a malfunction appears in the emission of a symbology from the computer 2 to the display device 3, for example when the computer 2 is no longer able to measure or calculate the symbology, or when the connection between the computer 2 and the display device 3 exhibits a particular malfunction, the display device 3 is switched to the back-up mode of operation, in which mode it is able to continue to display this symbology. To do this, during normal operation, any symbology generated by the computer 2 and intended for the display device 3 is recorded and, when a malfunction occurs, the last recorded symbology is utilised for the display. As a consequence, through use of the invention, during a malfunction of the computer 2 no loss of displayed symbology occurs.

The present invention does not apply to all symbologies, but to a symbology which is referenced within a geographical frame of reference, which is not moving with time (or only in a negligible way), such that the last coordinates recorded can be utilised. By way of illustration, the longitude and latitude coordinates of a beacon installed on the ground do not change over the course of an aircraft's flight.

Of course, when a malfunction is detected by the monitoring means 13, the display system 1 automatically suspends recording in the memory 11A, 11B of any symbology affected by the malfunction which is received from said computer 2.

Moreover, during detection of a malfunction and switching to the back-up mode, the display system (1) continues to monitor the emission of symbology, in such a way as to be able to detect a return to normal operation. Said display system 1 contains the auxiliary means 17 (automatically or manually controlled) to perform a switch in the event of detecting a return to normal operation, from the back-up mode of operation to the normal mode of operation in which the computing unit 5 will again take into account the symbologies (previously affected by the malfunction) received from said computer 2, or from another computer.

Figure 3:
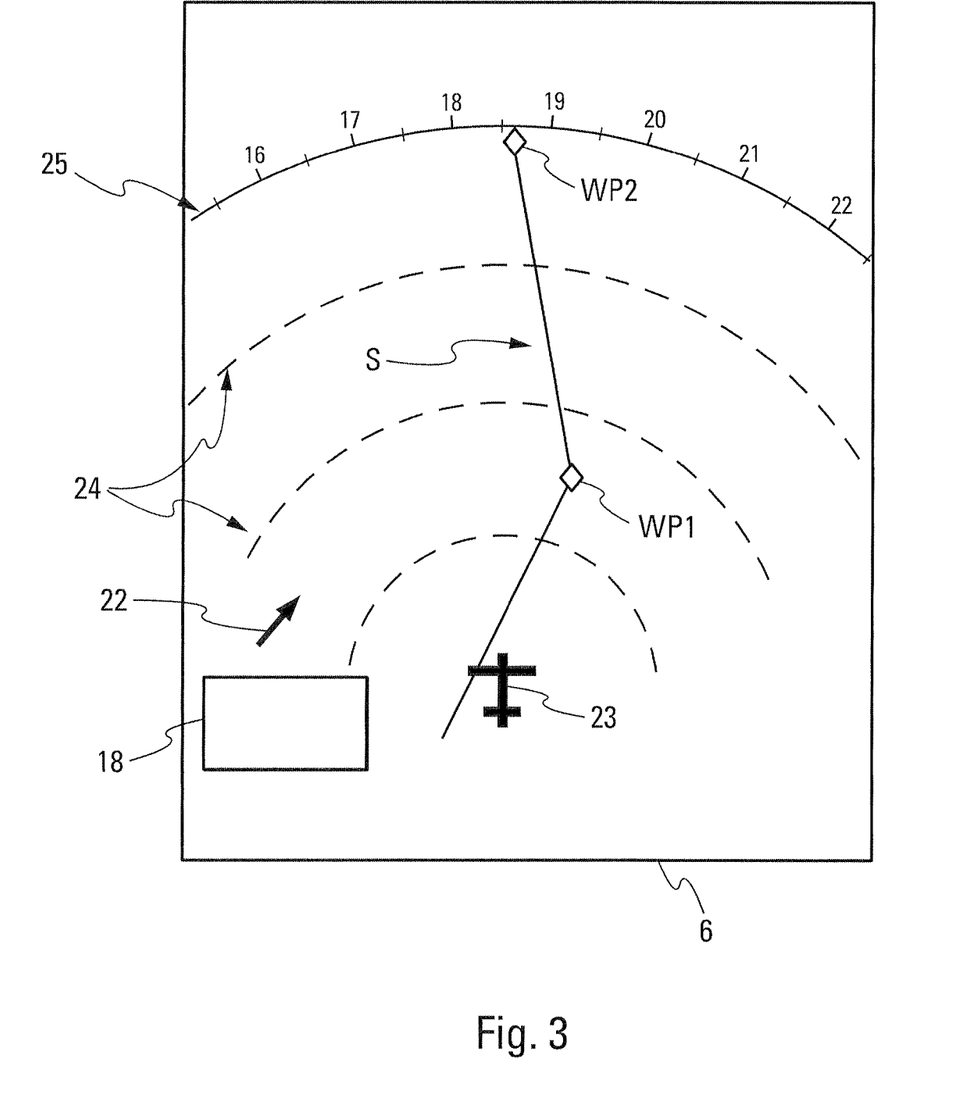
FIG. 3 schematically shows a navigation data display, relating to the embodiment of FIG. 1.

In a first variation of the embodiment represented in FIGS. 1, 2 and 3, the auxiliary means 17 comprise:

monitoring means, for example said monitoring means 13, for automatically monitoring the emission of symbology performed by the computer 2 in such a way as to be able to detect a return to normal operation;

an interactive screen, in particular the visualisation screen 6, which, when a return to normal operation is detected, displays as depicted in FIG. 3 a sensitive object 18 which is able to be activated. In the example of FIG. 3 the sensitive object 18 represents a highlighted rectangular area in which, for example, a text is displayed, in particular a text indicating the departure from the back-up mode, for example: "exit back-up mode". Activation of this sensitive object 18 causes automatic switching from the back-up mode of operation to the normal mode of operation; and usual means 20, for example a designator such as a computer mouse or a trackball, which are linked via a connection 21 to said display device 3 and which enable an operator, in particular the pilot of an aircraft, to manually operate said interactive screen 6 in order to activate the sensitive object 18. To do this, said means 20 enables control of a cursor, shown by an arrow 22 in FIG. 2, in order to be able to place it on the sensitive object 18, to select the object and then to confirm it (to activate the sensitive object 18 and hence activate the aforementioned switch.

It is to be noticed that, in the example of FIG. 3, the visualisation screen 6 is a common navigation screen of the Navigation Display type, ND, comprising in the displayed ARC mode:

a usual symbol 23 illustrating the current position of the aircraft, on which the display is centred in this ARC mode;

a usual distance scale 24, which represents the distance relative to the current position of the aircraft;

a usual bearing scale 25; and a symbology S which, in the example depicted, corresponds to a flight plan which passes over two "waypoints", WP1 and WP2.

Since the positions of these waypoints WP1 and WP2 do not change with time, the symbology S, representing the flight plan to be followed by the aircraft, continues to be displayed on the navigation display, ND, even when the computer 2 which transmits information in view of this display exhibits a malfunction, and this thanks to the above disclosed characteristics of the system 1 according to the invention (transmission and taking into account of information recorded in the memory 11A, 11B).

Figure 4:
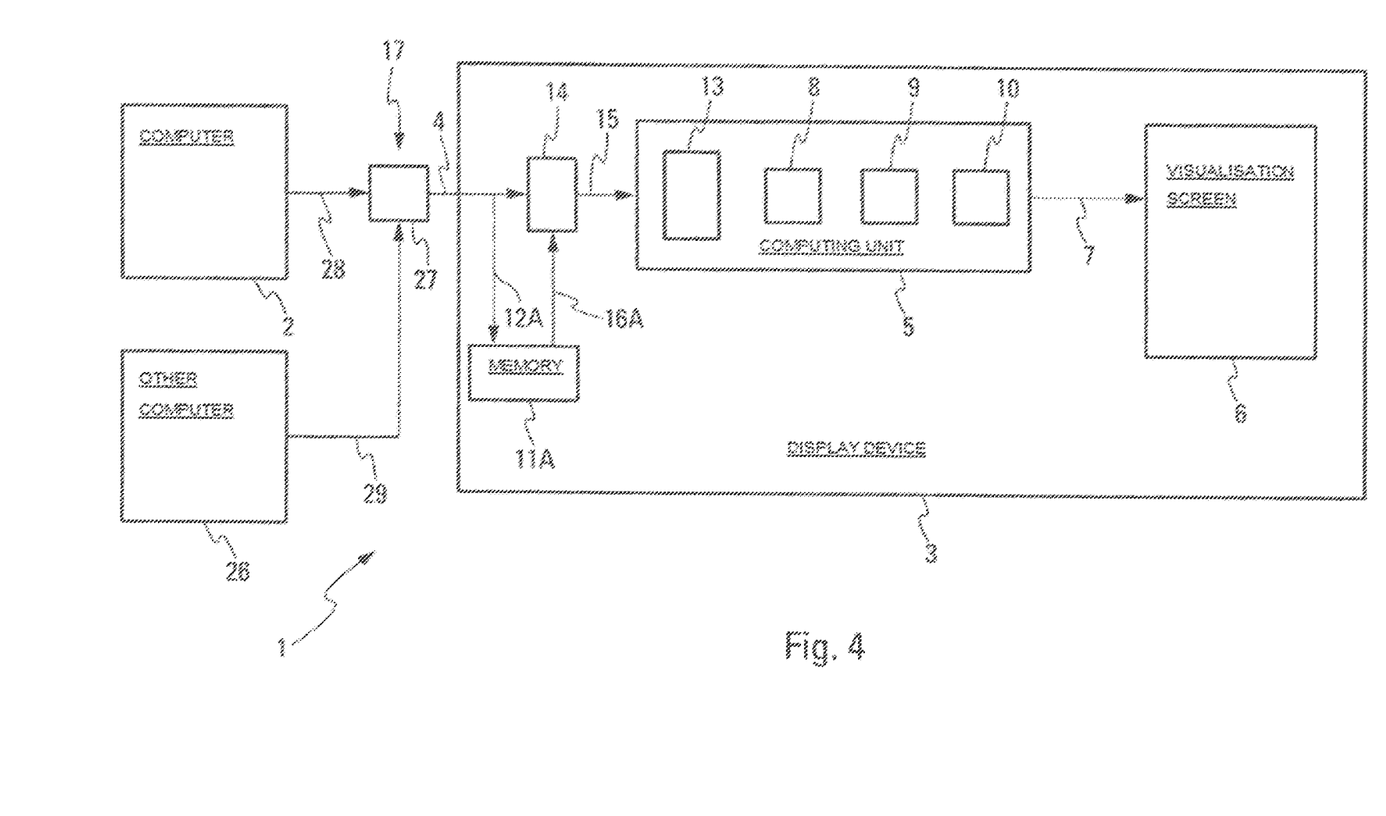
FIGS. 4 and 5 show two other embodiments of a display system according to the invention.
Figure 5:
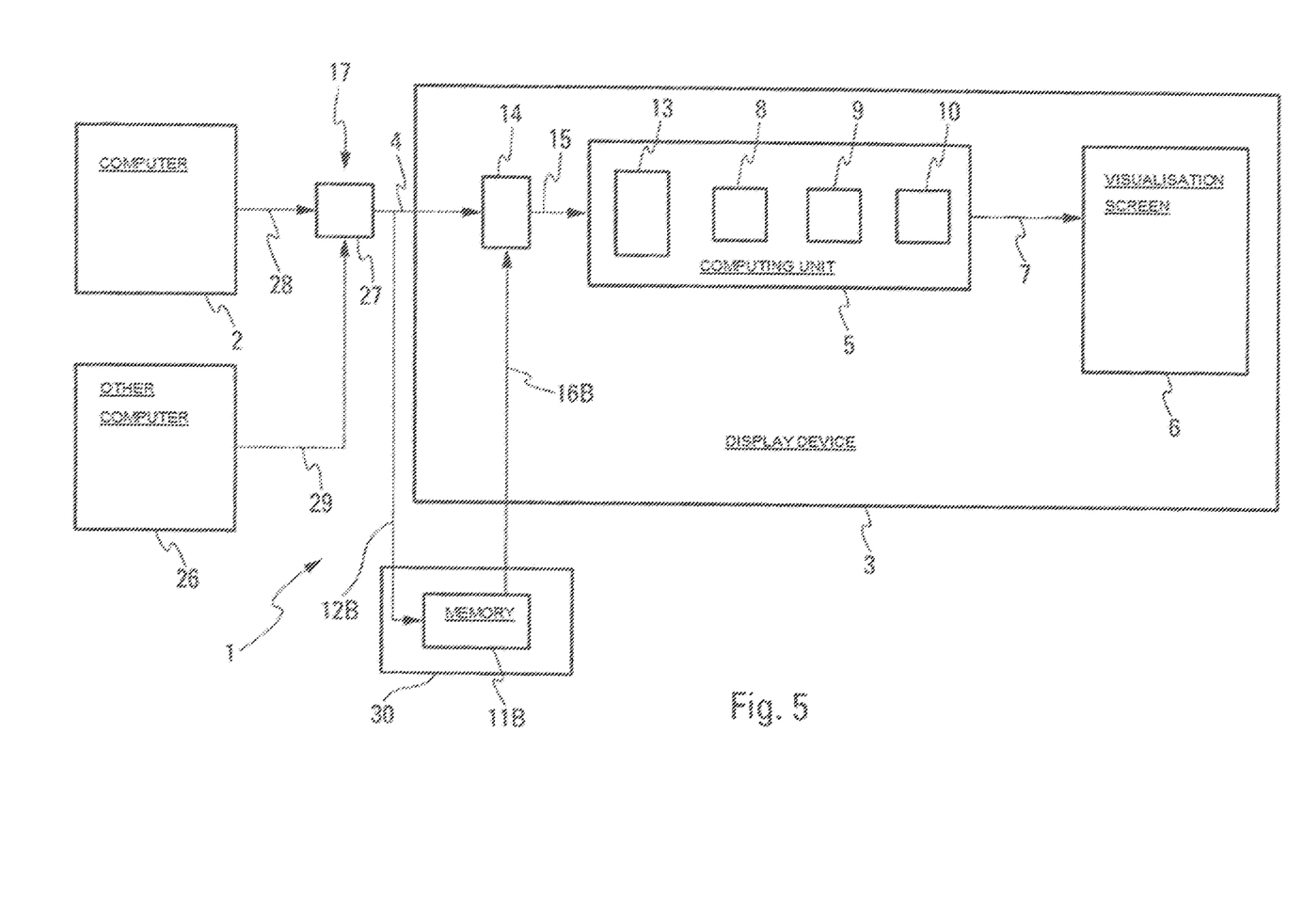

Furthermore, in a second variation of the embodiment represented in FIGS. 4 and 5, said display system 1 comprises, as well as said computer 2 (preferably of the flight management computer type, FMC), an auxiliary computer 26, for example also an FMC type computer, which emits the same information as said computer 2. In this variation of the embodiment, the system 1 comprises usual switching means 27 which are linked via the connection 4 to said display device 3 and via the connections 28 and 29 to said computers 2 and 26, respectively.

In this particular variation of the embodiment, the computer 2 is used as a main computer which transmits the required information to the display device 3 as long as it is not broken down. However, when a breakdown does affect its operation, the (automatically or manually controlled) switching means 27 switches the display device 3 to the other computer 26 which therefore represents a back-up computer.

In this case, according to the invention, the auxiliary means 17, which bring about the return to a normal mode of operation, are automatically controlled by the switching of the display device 3 to the auxiliary computer 26 (via the switching means 27).

As a consequence, in this second variation of the embodiment, the computing unit 5 utilises:

in normal operations, the symbology received from the computer 2;

in back-up mode of operation, the symbology last recorded in the memory 11; and after a switch to the other computer 26, the symbology received from that computer 26.

The back-up operation can be activated in the event of a breakdown of computer 2 before a switch to the other computer 26 and/or in the case of breakdown of both computers, 2 and 26, after a preliminary switch to said computer 26.

It is to be noticed that the auxiliary means relating to this second variation of the embodiment can be implemented in addition and/or as a variant of the auxiliary means relating to the first variation of the embodiment disclosed above.

Furthermore, in a first mode of the preferred embodiment, represented in FIGS. 1 and 4, said memory 11A is integrated directly into the display device 3 of the "Control and Display System" type, CDS, for example.

Moreover, in another embodiment, depicted in FIGS. 2 and 5, said memory 11B is neither part of computer 2, nor of the display device 3, but is included into the auxiliary computer 30. This auxiliary computer 30 may be an ordinary computer which is interfaced with the flight management system to compute the variations in the trajectory with respect to the flight plan received from said flight management system.

The invention claimed is:

1. A display method for an aircraft, for displaying at least one symbology, wherein the at least one symbology has a fixed position within at least one geographical frame of reference, a method according to which:

a) a computer (2) emits, in a repetitive manner, to a destination of at least one display device (3), at least one symbology in the form of a protocol which comprises at least one graphic object provided with geographical coordinates which are defined in said geographical frame of reference;

b) said display device (3) carries out the following operations comprising:
   automatically analyzing each symbology being received so as to identify the corresponding graphic object;
   automatically projecting such graphic object into a display frame of reference which is linked to a visualisation screen (6) in such a manner as to obtain the auxiliary coordinates which are defined in this display frame of reference; and
   automatically transmitting display information to said visualisation screen (6), including the said graphic object and said auxiliary coordinates; and c) said symbology (S) is displayed on said visualisation screen (6), in accordance with said display information, wherein,
   each symbology emitted by said computer (2) and destined for said display device (3) is automatically recorded in a memory (11A, 11B) outside said computer (2);
   the emission of symbology performed by said computer is automatically monitored in such a way as to detect a possible malfunction; and
   when such a malfunction is detected, a switch is automatically effected:
   from a normal mode of operation, which utilises the symbologies received from said computer (2) to carry out steps b) and c) and is activated when no malfunction is present;
   to a back-up mode of operation, which utilises the last symbology stored in said memory (11A,11B) to carry out steps b) and c), wherein, after a malfunction is detected, the emission of symbology continues to be monitored in such a way as to be able to detect a return to normal operation and, in the event of detection of a return to normal operation, a switch is made from back-up operating mode to normal operating mode in which the symbologies received from a computer (2, 26) are again taken into account for carrying out steps b) and c).

2. Method according to claim 1, wherein, when a malfunction is detected, the recording in said memory (11A, 11B) of the symbology received from said computer (2) is automatically suspended.

3. Method according to claim 1, wherein said memory (11A) is integrated into said display device (3).

4. Method according to claim 1, wherein said memory (11B) is integrated into an auxiliary computer (30).

5. Display system for an aircraft, for displaying at least one symbology, having a fixed position within at least one geographical frame of reference, said system (1) comprising:

a computer (2) which transmits, in a repetitive manner, to a destination of at least one display device (3), at least one symbology in the form of a protocol which includes at least one graphic object provided with geographical coordinates which are defined in said geographical frame of reference;

said display device (3) which comprises:
   first means (8) for automatically analysing each symbology received, in such a way as to identify the corresponding graphic object;

second means (9) for automatically projecting this graphic object into a display frame of reference linked to a visualisation screen (6) in such a way as to obtain the auxiliary coordinates which are defined in said display frame of reference; and third means (10) for automatically transmitting display information to said visualisation screen, including said graphic object and said auxiliary coordinates; and said visualisation screen (6) which displays said symbology (S), in accordance with said display information received from said third means (10), further comprising:

a memory (11A, 11B) which is external to said computer (2) and which is formed in such a way as to automatically record each symbology transmitted by said computer (2) and intended for said display device (3);

monitoring means (13) for automatically monitoring the emission of symbology performed by said computer (2) in such a manner as to be able to detect a possible malfunction;

switching means (14) which are integrated into said display device (3) and which are designed in such a manner as to automatically carry out, when a malfunction is detected by said monitoring means (13), a switching:

from a normal mode of operation, for which said first means (8) take into account the symbologies received from said computer (2) and which is active in the absence of a malfunction;

to a back-up mode of operation, for which said first means (8) utilises the last symbology recorded in said memory (11A, 11B);

auxiliary means (17) to perform, when a return to normal operation is detected, a switching from a back-up mode of operation to the normal mode of operation, in which said first means (8) again take into account the symbologies received from a computer (2, 26).

6. Display system according to, claim 5 wherein said auxiliary means (17) comprise:

monitoring means (13) for automatically monitoring the emission of symbology carried out by said computer (2) in such a manner as to be able to detect a return to normal operation;

an interactive screen (6) which displays, when a return to normal function is detected, a sensitive object (18) able to be activated, an activation of which sensitive object (18) causes an automatic switch from the back-up mode of operation to the normal mode of operation; and means (20) enabling an operator to activate said sensitive object (18).

7. Display system according to, claim 6 wherein said auxiliary means (17) are automatically ordered by switch of the display device (3) to an auxiliary computer (26), which is used in place of said computer (2) to emit symbologies.

8. Display system according to claim 5, wherein said memory (11A) is integrated into said display device (3).

9. Display system according to claim 5, wherein said memory (11B) is integrated into an auxiliary computer (30).

10. Aircraft, comprising a display system (1) such as that specified in claim 5.

11. A display method for an aircraft, for displaying at least one symbology, having a fixed position within at least one geographical frame of reference, a method according to which:

a) a computer (2) emits, in a repetitive manner, to a destination of at least one display device (3), at least one symbology in the form of a protocol which comprises at least one graphic object provided with geographical coordinates which are defined in said geographical frame of reference, wherein said geographical frame of reference is defined in a horizontal plane;

b) said display device (3) carries out the following operations comprising:

automatically analyzing each symbology being received so as to identify the corresponding graphic object;

automatically projecting such graphic object into a display frame of reference which is linked to a visualisation screen (6) in such a manner as to obtain the auxiliary coordinates which are defined in this display frame of reference; and automatically transmitting display information to said visualisation screen (6), including the said graphic object and said auxiliary coordinates; and c) said symbology (S) is displayed on said visualisation screen (6), in accordance with said display information, wherein:

each symbology emitted by said computer (2) and destined for said display device (3) is automatically recorded in a memory (11A, 11B) outside said computer (2);

the emission of symbology performed by said computer is automatically monitored in such a way as to detect a possible malfunction; and when such a malfunction is detected, a switch is automatically effected:

from a normal mode of operation, which utilises the symbologies received from said computer (2) to carry out steps b) and c) and is activated when no malfunction is present;

to a back-up mode of operation, which utilises the last symbology stored in said memory (11A,11B) to carry out steps b) and c).

12. Method according to claim 1, wherein said geographical frame of reference comprises a terrestrial frame of reference which defines any point on the terrestrial globe by longitude and latitude.

13. Display system according to claim 5, wherein said geographical frame of reference comprises a terrestrial frame of reference which defines any point on the terrestrial globe by longitude and latitude.

* * * * *